(12) United States Patent
Yamashita et al.

(10) Patent No.: US 12,403,929 B2
(45) Date of Patent: Sep. 2, 2025

(54) DRIVING ASSIST APPARATUS

(71) Applicant: TOYOTA JIDOSHA KABUSHIKI KAISHA, Aichi (JP)

(72) Inventors: Takaya Yamashita, Nagoya (JP); Junya Fukuta, Nissin (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 142 days.

(21) Appl. No.: 18/491,804

(22) Filed: Oct. 23, 2023

(65) Prior Publication Data

US 2024/0174250 A1 May 30, 2024

(30) Foreign Application Priority Data

Nov. 29, 2022 (JP) .................................. 2022-189713

(51) Int. Cl.
| | | |
|---|---|---|
| *B60Q 1/00* | (2006.01) | |
| *B60W 30/095* | (2012.01) | |
| *B60W 30/18* | (2012.01) | |
| *B60W 50/10* | (2012.01) | |
| *B60W 50/14* | (2020.01) | |

(52) U.S. Cl.
CPC ........ *B60W 50/14* (2013.01); *B60W 30/0956* (2013.01); *B60W 30/18159* (2020.02); *B60W 50/10* (2013.01); *B60W 2554/4026* (2020.02); *B60W 2554/4041* (2020.02); *B60W 2554/4044* (2020.02)

(58) Field of Classification Search
CPC ............. B60W 50/14; B60W 30/0956; B60W 30/18159; B60W 50/10; B60W 2554/4026; B60W 2554/4041; B60W 2554/4044; B60W 30/09; B60W 2050/143

See application file for complete search history.

(56) References Cited

U.S. PATENT DOCUMENTS

| | | | |
|---|---|---|---|
| 9,701,306 B2 * | 7/2017 | Prokhorov | ............ B60W 30/09 |
| 9,969,261 B2 | 5/2018 | Kodama | |
| 9,975,483 B1 * | 5/2018 | Ramaswamy | ......... B60Q 11/00 |
| 10,045,173 B1 | 8/2018 | Morimura et al. | |
| 10,106,157 B2 | 10/2018 | Sawada et al. | |
| 10,150,407 B2 | 12/2018 | Takahashi et al. | |
| 10,696,297 B2 | 6/2020 | Nguyen Van et al. | |
| 11,001,255 B2 | 5/2021 | Fukuman et al. | |

(Continued)

FOREIGN PATENT DOCUMENTS

JP 2017-224164 A 12/2017

*Primary Examiner* — Toan N Pham

(74) *Attorney, Agent, or Firm* — HAUPTMAN HAM, LLP

(57) ABSTRACT

In a driving assist apparatus which performs a warning about an object approaching a self-vehicle from a rear side when a first intention that is an intention of a driver who is going to make the self-vehicle turn at an intersection is detected, an arrival time that is a period from a first time point that is a time point when the first intention is detected until the self-vehicle reaches an intersection point of running paths estimated for the object and self-vehicle is estimated, a stoppage time that is a period from the first time point until stoppage of the self-vehicle is completed is estimated according to operation states of an accelerator and/or brake at the first time point, necessity of the warning is judged based on the arrival time and stoppage time, and the warning is performed only when the warning is judged to be necessary.

4 Claims, 5 Drawing Sheets

(56) References Cited

U.S. PATENT DOCUMENTS

| | | | |
|---|---|---|---|
| 11,110,937 B2 | 9/2021 | Kinoshita et al. | |
| 2009/0243880 A1* | 10/2009 | Kiuchi | G08G 1/166 |
| | | | 342/107 |
| 2015/0124096 A1* | 5/2015 | Koravadi | G06V 20/584 |
| | | | 348/148 |
| 2017/0206788 A1* | 7/2017 | Hu | G08G 1/09626 |
| 2019/0001968 A1 | 1/2019 | Yorifuji et al. | |
| 2019/0344828 A1 | 11/2019 | Omori et al. | |
| 2019/0389488 A1 | 12/2019 | Yamada et al. | |
| 2023/0282112 A1* | 9/2023 | James | G08G 1/056 |
| | | | 340/436 |

* cited by examiner

DRIVING ASSIST APPARATUS

RELATED APPLICATIONS

The present application claims priority to Japanese Patent Application No. 2022-189713, filed Nov. 29, 2022, the disclosure of which is hereby incorporated by reference herein in its entirety.

TECHNICAL FIELD

The present invention relates to a driving assist apparatus.

BACKGROUND ART

A technology to call for attention for avoiding what is called a "hit by a turning vehicle" in which a motorcycle, etc. running on a left or right side of a road contacts with a side surface of a vehicle turning to the left or right at an intersection, etc. has been known. For example, in the patent document 1 (PTL1), a technology to perform a driving assist for avoiding a contact of a self-vehicle and a motorcycle in a case where a distance between an intersection in front of the self-vehicle and the motorcycle behind the self-vehicle is less than a predetermined threshold value when the self-vehicle starts running based on an instruction from a traffic signal at the intersection and is going to turn to the left or right at the intersection after the self-vehicle stopped based on an instruction from the traffic signal at the intersection is disclosed.

CITATION LIST

Patent Literature

[PTL 1] Japanese Patent Application Laid-Open (kokai) No. 2017-224164

SUMMARY OF INVENTION

Technical Problem

However, since a relative velocity of a self-vehicle and a motorcycle behind the self-vehicle is not taken into consideration in the above-mentioned prior art, there is a possibility that the self-vehicle may obstruct a course of the motorcycle depending on reaction time of a driver to the information provision to the driver, such as a warning, and/or time required for the self-vehicle to stop, for example.

Namely, in the art, a technology which can appropriately perform a driving assist for avoiding a contact of a self-vehicle going to turn to the left or right at an intersection and a moving object approaching the self-vehicle from a rear side of the self-vehicle without obstructing a course of the moving object.

Solution to Problem

As a result of diligent research, the present inventor has found out that the above-mentioned problem can be solved by judging necessity of a warning to a driver based on a period required for a self-vehicle to reach an intersection point of a course of a moving object approaching the self-vehicle from a rear side of the self-vehicle and a course of the self-vehicle going to turn to the left or right and a period required for the self-vehicle to stop.

Specifically, a driving assist apparatus according to the present invention (which may be referred to as a "present invention apparatus" hereafter) is a driving assist apparatus comprising an intention detecting part, a moving object detecting part and a warning part. The intention detecting part detects a first intention that is an intention of a driver who is going to make a self-vehicle turn to the left or right at an intersection in front of the self-vehicle. The moving object detecting part detects a first object that is a moving object approaching the self-vehicle from a rear side on a side to which the self-vehicle turns to the left or right when the first intention is detected. The warning part performs a first warning that is a warning about the first object when the first object is detected In the present invention apparatus, the moving object detecting part is configured to realize the following functions (a) to (d).

(a) An arrival time that is a period from a first time point that is a time point when the first intention is detected to a second time point that is a time point when the self-vehicle reaches a first intersection point is estimated. The first intersection point is an intersection point of a first locus that is a running path estimated for the first object and a second locus that is a running path estimated for the self-vehicle.

(b) A stoppage time that is a period from the first time point to a third time point that is a time point when stoppage of the self-vehicle is completed under a predetermined condition is estimated according to operation states of an accelerator pedal and/or a brake pedal by the driver at the first time point.

(c) Necessity of the first warning is judged based on the arrival time and the stoppage time.

(d) The warning part is made to perform the first warning only when the first warning is judged to be necessary.

Advantageous Effects of Invention

As mentioned above, in the present invention apparatus, the necessity of the first warning is judged based on the arrival time and stoppage time estimated by the moving object detecting part. Therefore, in accordance with the present invention apparatus, the first warning can be prevented from being performed when there is a high possibility to obstruct a course of the moving object approaching the self-vehicle from the rear side if the driver stops the self-vehicle going to turn to the left or right at an intersection as a result of performing the first warning. Namely, in accordance with the present invention, a warning as a driving assist for avoiding a contact of a self-vehicle going to turn to the left or right at an intersection and a moving object approaching the self-vehicle from a rear side of the self-vehicle can be appropriately performed without obstructing a course of the moving object.

DESCRIPTION OF EMBODIMENTS

First Embodiment

Hereafter, a driving assist apparatus according to a first embodiment of the present invention (which may be referred to as a "first apparatus" hereafter) will be explained, referring to drawings.

Configuration

Figure 1:
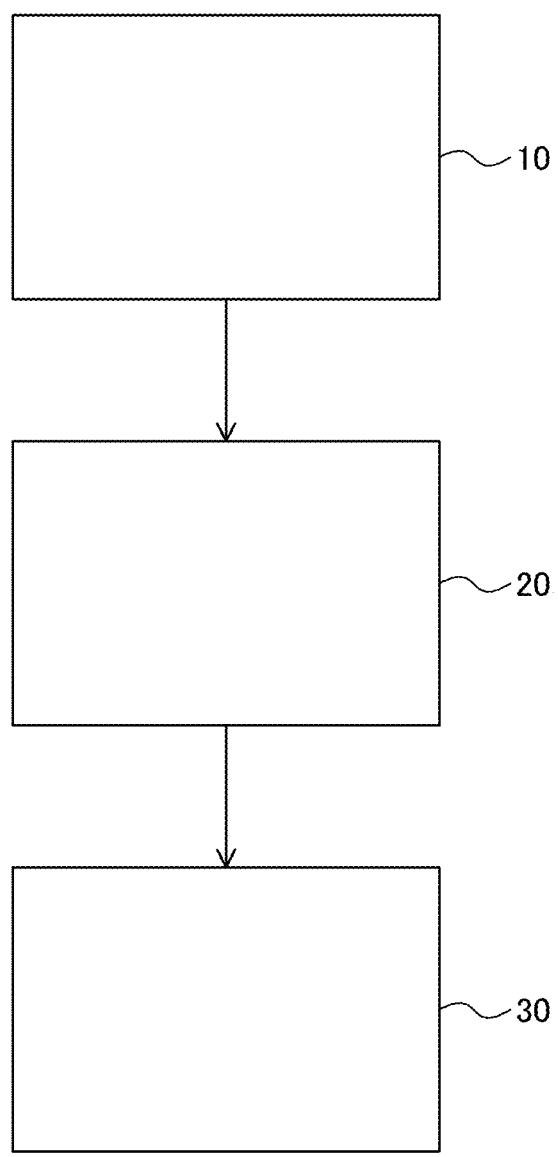
FIG. 1 is a schematic block diagram for showing an example of a functional configuration of a driving assist apparatus according to a first embodiment of the present invention (first apparatus).

FIG. 1 is a schematic block diagram for showing an example of a functional configuration of the first apparatus. The first apparatus 101 exemplified in FIG. 1 is a driving assist apparatus comprising an intention detecting part 10, a moving object detecting part 20 and a warning part 30. The intention detecting part 10 detects a first intention that is an intention of a driver who is going to make a self-vehicle turn to the left or right at an intersection in front of the self-vehicle. A configuration of the intention detecting part 10 is not limited as long as it is possible to detect the first intention that is the intention of the driver who is going to make the self-vehicle turn to the left or right at the intersection in front of the self-vehicle. For example, the intention detecting part 10 may be configured so as to detect the first intention based on an operation of a blinker lever by the driver.

The moving object detecting part 20 detects a first object that is a moving object approaching the self-vehicle from a rear side on a side to which the self-vehicle turns to the left or right when the first intention is detected. A configuration of the moving object detecting part 20 is not limited as long as it is possible to detect the moving object approaching the self-vehicle from a rear side on a side to which the self-vehicle turns to the left or right when the first intention is detected. For example, the moving object detecting part 20 may be what is called "blind spot monitor (BSM)" which detects an object located in a driver's seat side, a passenger seat side and a rear side, etc. outside the vehicle by a camera, a sensor or a millimeter-wave radar built in a body and/or a door mirror, etc. of the vehicle.

The warning part 30 performs a first warning that is a warning about the first object when the first object is detected. More specifically, in a case where the first object that is a moving object approaching the self-vehicle from a rear side on a side to which the self-vehicle turns to the left or right when the first intention is detected by the moving object detecting part 20, the warning part 30 performs the first warning that is a warning about the moving object. The first warning may be an image and/or character indicated on a display, such as a multi-information display (MID), a sound and/or voice made by sound apparatus, such as a buzzer and/or speaker, or vibration and/or light emitted by a vibrator and/or indicator, etc., for example.

In the first apparatus, the moving object detecting part is configured to realize the following functions (a) to (d).

(a) An arrival time that is a period from a first time point that is a time point when the first intention is detected to a second time point that is a time point when the self-vehicle reaches a first intersection point is estimated. The first intersection point is an intersection point of a first locus that is a running path estimated for the first object and a second locus that is a running path estimated for the self-vehicle.

Figure 2:
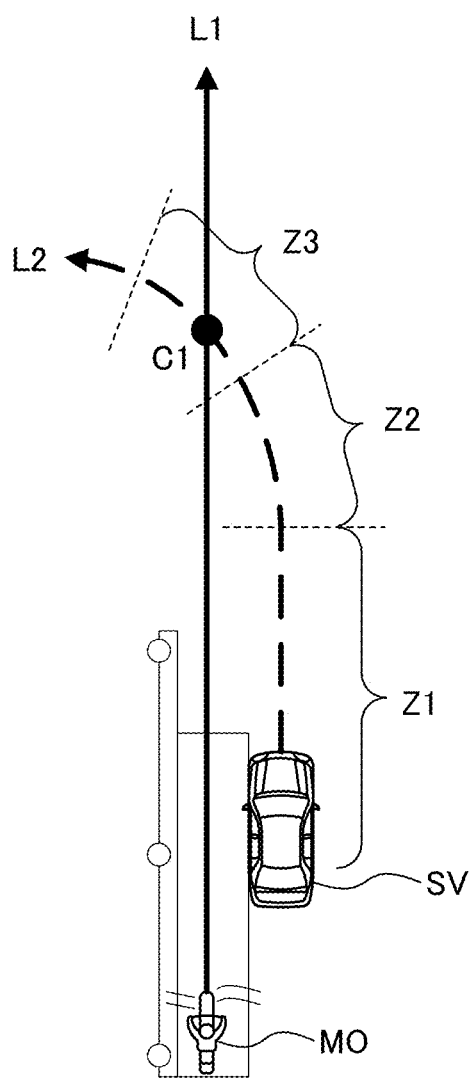
FIG. 2 is a schematic view for showing an example of a positional relation between a first object and a first locus as well as a self-vehicle and a second locus at a first time point.

FIG. 2 is a schematic view for showing an example of a positional relation between a first object and a first locus as well as a self-vehicle and a second locus at a first time point that is a time point when a first intention that is an intention of a driver who is going to make a self-vehicle turn to the left or right at an intersection in front of the self-vehicle. In addition, in FIG. 2, a situation where a motorcycle as the first object MO is approaching a self-vehicle SV from a rear side on the left-hand side of the self-vehicle SV when the driver who is going to make the self-vehicle SV turn left at an intersection in front of the self-vehicle SV.

The arrow L1 drawn by a thick solid line represents a first locus that is a running path estimated for the first object MO. The first locus L1 can be calculated as a running path of the first object MO estimated when the first object MO continues running while maintaining the speed and the turning radius of the first object MO at the first time point T1. Therefore, when the first object MO is running straight at the first time point T1, the first locus L1 becomes a straight line.

On the other hand, the arrow L2 drawn by a thick broken line represents a second locus that is a running path estimated for the self-vehicle SV. The first section Z1 is what is called "deceleration section", the second section Z2 is what is called "clothoid section", and the third section Z3 is what is called "regular circle section."

The first section Z1 is a section in which the speed V1 of the self-vehicle SV at the first time point T1 is decelerated at predetermined deceleration D1 to predetermined speed V2 suitable for making the self-vehicle SV advance into the second section Z2 and making the self-vehicle SV start turning for left turn. A running path of the self-vehicle SV estimated in the first section Z1 can be calculated as a running path of the self-vehicle SV estimated when the self-vehicle SV decelerates as mentioned above while maintaining the turning radius R1 of the self-vehicle SV at the first time point T1. Therefore, when the self-vehicle SV are running straight at the first time point T1, the running path estimated in the first section Z1 becomes as a straight line.

Next, the second section Z2 is a section in which the self-vehicle SV is decelerated and turned at a predetermined deceleration D2 and a predetermined steering speed S2 such that the speed V2 and the turning radius R1 of the self-vehicle SV upon entering the second section Z2 becomes a predetermined speed V3 and a predetermined turning radius R3 for making the self-vehicle SV enter the third section Z3 and turn to the left Therefore, the running path of the self-vehicle SV estimated in the second section Z2 can be calculated as a clothoid curve based on the above-mentioned parameters such as the speed V2 and the turning radius R1, the speed V3 and the turning radius R3 as well as the deceleration D2 and the steering speed S2 of the self-vehicle SV.

Next, the third section Z3 is a section in which the self-vehicle SV is turned while maintaining the speed V3 and the turning radius R3 of the self-vehicle SV upon entering the third section Z3. Therefore, the running path of the self-vehicle SV estimated in the third section Z3 can be calculated as a circular arc with the turning radius R3 as its radius. As apparent from FIG. 2, the second locus L2 that is a running path estimated for the self-vehicle SV becomes a linkage (connected path) of the running paths of the self-vehicle SV estimated in the above-mentioned first section Z1 to the third section Z3.

As indicated by the black round mark C1 in FIG. 2, the first intersection point is defined as an intersection of the first locus L1 that is a running path estimated for the first object MO and the second locus L2 that is a running path estimated for the self-vehicle SV. Therefore, the arrival time TA that is a period from the first time point T1 to a second time point T2 that is a time point when the self-vehicle SV reaches the first intersection point C1 can be calculated as a length of a period required for the self-vehicle SV to run from its position at the first time point T1 of the self-vehicle SV on the second locus L2 to its position at the second time T2.

In addition, specific numerical values of the above-mentioned parameters such as the speed V2 and the turning radius R1, the speed V3 and the turning radius R3 as well as the deceleration D2 and the steering speed S2 of the self-vehicle SV can be determined such that it is possible to calculate the second locus L2 that is a running path estimated for the self-vehicle SV at acceptable accuracy. For example, the specific numerical values of these parameters can be determined as representative value (for example, average values or median values, etc.), such as speeds, turning radii as well as decelerations and steering speeds of the self-vehicle SV measured up on turning to the left and/or right of the self-vehicle SV by a large number of drivers in experimental runs and/or on ordinary roads. Furthermore, the respective parameters defined in this way may be corrected and updated according to driving tendencies of individual drivers.

(b) A stoppage time TS that is a period from the first time point T1 to a third time point T3 that is a time point when stoppage of the self-vehicle SV is completed under a predetermined condition is estimated according to operation states of an accelerator pedal and/or a brake pedal by the driver at the first time point T1. The stoppage time TS is a length of a period required for the self-vehicle SV to stop at the third time point T3 when the driver tends to stop the self-vehicle SV based on the first warning by the warning part 30 at the first time point T1 (TS=T3−T1). More specifically, the stoppage time TS is equivalent to the sum of a ready time TP that is a length of a period required for the self-vehicle SV to start deceleration and a braking time TB that is a length of a period after the self-vehicle SV starts to deceleration until the self-vehicle SV stops (TS=TP+TB).

The ready time TP becomes is determined by a reaction time that is a length of a period required for the driver to start braking of the self-vehicle SV in response to the first warning performed at the first time point T1, and the reaction time changes with the operation states of the accelerator pedal and/or the brake pedal by the driver at the first time point T1.

Specifically, when the driver has stepped on the brake pedal at the first time point T1, the shortest reaction time TR1 becomes the ready time TP. When the driver has stepped on the accelerator pedal at the first time point T1, the longest reaction time TR3 becomes the ready time TP. Furthermore, when the driver has stepped on neither the accelerator pedal nor the brake pedal at the first time point T1, the reaction time TR2 having a medium length between those of the reaction time TR1 and the reaction time TR3 becomes the ready time TP. Namely, the ready time TP becomes any of the reaction times TR1, TR2 or TR3 according to the operation states of the accelerator pedal and/or the brake pedal by the driver at the first time point T1.

On the other hand, the braking time TB that is a length of a period after the self-vehicle SV starts deceleration until the self-vehicle SV stops is a length of a period required for decelerating the self-vehicle SV running on the second locus L2 at the speed V1 at the first time point T1 at a deceleration D3 to stop the self-vehicle SV. Therefore, strictly speaking, the braking time TB is a length of a period required for decelerating the speed of the self-vehicle SV at a time point when the above-mentioned ready time TP has passed since the first time point T1 to zero (0) km/h at the deceleration D3. However, since the ready time TP is very short in general, the braking time TB may be estimate roughly as a length of a period required for decelerating the speed V1 of the self-vehicle SV at the first time point T1 to zero (0) km/h at the deceleration D3.

The stoppage time TS can be calculated as the sum of the ready time TP and the braking time TB calculated as mentioned above.

Specific numerical values of the above-mentioned reaction times TR1 to TR3 and deceleration D3 are defined such that it is possible to calculate the stoppage time TS that is a period from the first time point T1 to the third time point T3 at acceptable accuracy. For example, the specific numerical values of these parameters can be determined as representative value (for example, average values or median values, etc.), such as the driver's reaction times of and decelerations measured upon braking in response to the warning of the self-vehicle SV by a large number of drivers in experimental runs and/or on ordinary roads. Furthermore, the respective parameters defined in this way may be corrected and updated according to driving tendencies of individual drivers.

(c) Necessity of the first warning is judged based on the arrival time and the stoppage time. Namely, the moving object detecting part 20 is configured so as to judge whether it is necessary to perform the first warning about the first object MO detected at the first time point T1 based on the arrival time TA acquired by the above-mentioned function (a) and the stoppage time TS acquired by the above-mentioned function (b). For example, it is judged that it is necessary to perform the first warning when the self-vehicle SV can stop before reaching the first intersection point C1 of the first locus L1 and the second locus L2 if the first warning is performed at the first time point T1, and it is judged that it is not necessary to perform the first warning otherwise. In order to judge the necessity of the first warning in this way, the moving object detecting part 20 may be configured so as to judge that the first warning is necessary when the arrival time TA is not less than the stoppage time TS, and to judge that the first warning is unnecessary when the arrival time TA is less than the stoppage time TS, for example.

(d) The warning part 30 is made to perform the first warning only when the first warning is judged to be necessary. Namely, the moving object detecting part 20 is configured so as to make the warning part 30 perform the first warning when it is judged that the first warning is necessary by the above-mentioned function (c), and to prevent the warning part 30 from performing the first warning when it is judged that the first warning is unnecessary by the above-mentioned function (c).

Functions of the moving object detecting part 20 as mentioned above can be realized by an ECU mounted on the self-vehicle SV, for example. In the present specification, the "ECU" is an electronic control unit comprising a microcomputer as its principal part, and may be referred to as a "controller". A microcomputer includes a CPU (processor), an ROM, an RAM, nonvolatile memory and an interface, etc. The CPU is configured so as to realize the above-mentioned respective functions by performing instructions (a program, a routine) stored in the ROM. These functions may be performed by one certain ECU which constitutes the first apparatus, or may be dispersively performed by a plurality of ECUs. In the latter case, a plurality of ECUs can be configured so as to be connected through a CAN (Controller Area Network), etc. to be able to communicate mutually.

Figure 3:
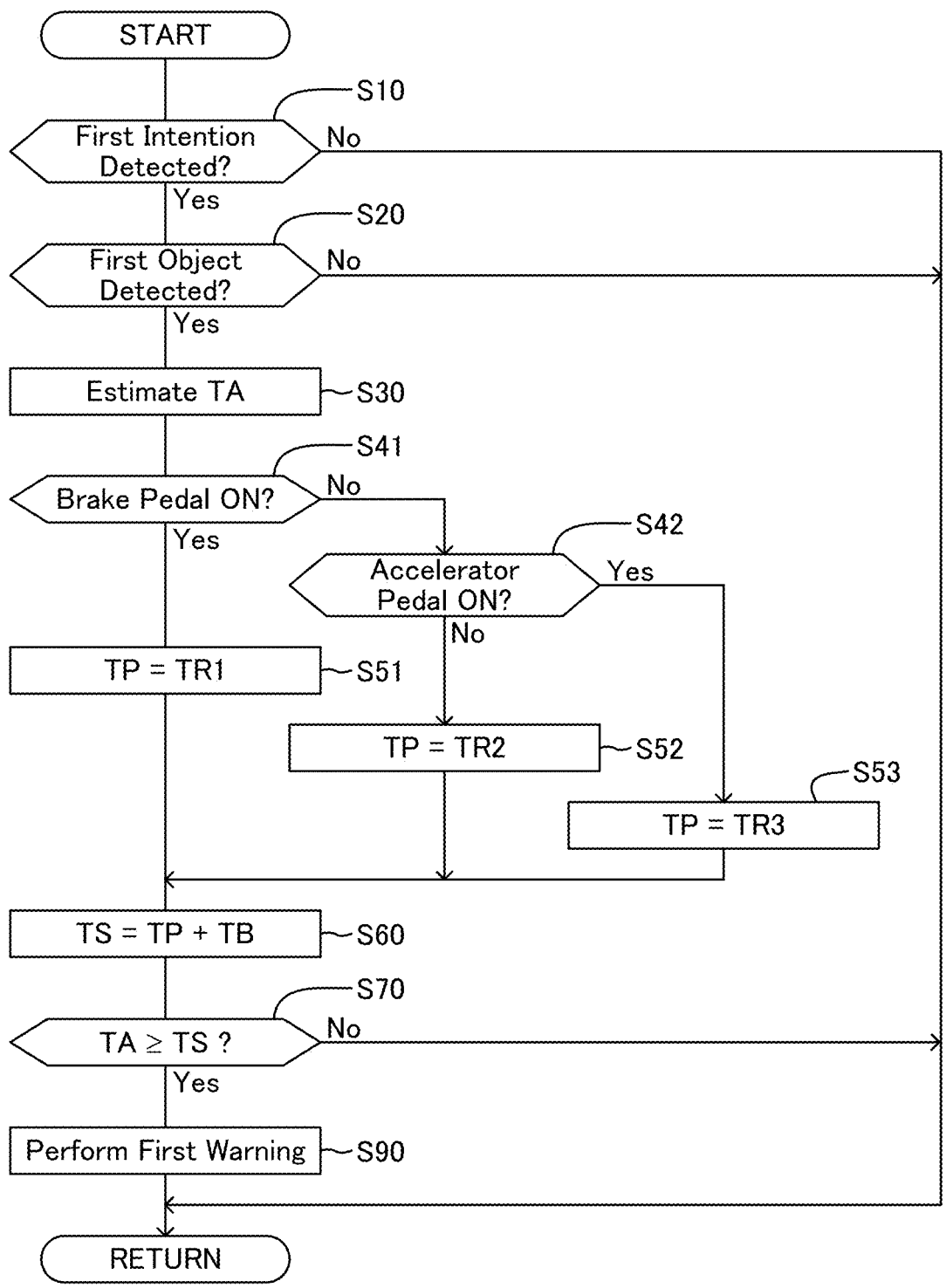
FIG. 3 is a flow chart for showing an example of a flow of various processing in a routine performed in the first apparatus.

FIG. 3 is a flow chart for showing an example of a flow of various processing in a routine for performing the above-mentioned functions in the first apparatus 101. In the self-vehicle which is not shown, when an ignition key is set to ON, various control including the driving assist performed by the first apparatus 101 will be started. The routine represented by the flow chart exemplified in FIG. 3 is repeatedly performed at a predetermined short time interval (for example, 0.05 second).

When the above-mentioned routine is started, it is judged whether the first intention that is an intention of the driver who is going to make the self-vehicle SV turn to the left or right at the intersection in front of the self-vehicle SV is detected or not, in Step S10. As mentioned above, the existence of the first intention can be detected based on the operation of the blinker lever by the driver.

When the first intention is detected (Step S10: Yes), this time point is recorded as the first time point T1 and it is judged whether the first object MO that is a moving object approaching the self-vehicle SV from a rear side on a side to which the self-vehicle SV turns to the left or right is detected or not in the following Step S20. On the other hand, when the first intention is not detected in Step S10 (Step S10: No), the routine is once ended. Namely, the first warning is not performed in this case.

When the first object MO is detected in Step S20 (Step S20: Yes), in the following step S30, the arrival time TA which is a period by the second time T2 of being a time of the self-vehicle SV reaching the first intersection point C1 from the first time point T1 is computed by the moving object detecting part 20. As mentioned above, the first intersection point C1 is an intersection with the second locus L2 that is a running path estimated for the first locus L1 and the self-vehicle SV which are the running path estimated for the first object MO. On the other hand, when the first object MO is not detected in Step S20 (Step S20: No), the routine concerned is once ended. Namely, the first warning is not performed in this case.

Then, the stoppage time TS that is a period from the first time point T1 to a third time point T3 that is a time point when stoppage of the self-vehicle SV is completed under a predetermined condition is calculated by the moving object detecting part 20, by performing the following Steps S41 and S42 as well as Steps S51, S52 and S53.

In the example shown in FIG. 3, it is first judged whether the driver has stepped on the brake pedal at the first time point T1 or not, in Step S41. When the driver has stepped on the brake pedal (Step S41: Yes), the predetermined short reaction time TR1 is set as the ready time TP in the following Step S51 (TP=TR1). On the other hand, when the driver has not stepped on the brake pedal (Step S41: No), it is judged whether the driver has stepped on the accelerator pedal at the first time point T1 or not in the following Step S42. When the driver has stepped on the accelerator pedal (Step S42: Yes), the predetermined long reaction time TR3 is set as the ready time TP in the following Step S53 (TP=TR3). On the other hand, when the driver has not stepped on the accelerator pedal (Step S42: No), the reaction time TR2 having a medium length between those of the reaction time TR1 and the reaction time TR3 is set as the ready time TP in the following Step S52 (TP=TR2).

Then, in the following Step S60, the stoppage time TS is calculated as the sum of the braking time TB that is the length of the period required for decelerating the self-vehicle SV which were running on the second locus L2 at the speed V1 at the first time point T1 at the predetermined deceleration D3 to stop the self-vehicle SV and the ready time TP set as mentioned above (TS=TP+TB).

In the following step S70, the necessity of the first warning is judged based on the arrival time TA and the stoppage time TS obtained as mentioned above. In the example shown in FIG. 3, it is judged that the first warning is necessary when the arrival time TA is not less than the stoppage time TS (Step S70: Yes), and the moving object detecting part 20 makes the warning part 30 perform the first warning in the following step S90. On the other hand, when the arrival time TA is less than the stoppage time TS (Step S70: No), it is judged that the first warning is unnecessary, the routine is once ended, and the first warning is not performed.

In other words, when it is judged that the self-vehicle SV can stop before reaching the first intersection point C1 of the first locus L1 and the second locus L2 if the first warning is performed at the first time point T1 (TA≥TS), the first warning is performed. On the other hand, when it is judged that there is a possibility that the self-vehicle SV cannot stop before reaching the first intersection point C1 of the first locus L1 and the second locus L2 even if the first warning is performed at the first time point T1 (TA<TS), the first warning is not performed.

Effects

As mentioned above, in the first apparatus, the necessity of the first warning is judged based on the arrival time and stoppage time estimated by the moving object detecting part. Therefore, in accordance with the first apparatus, the first warning can be prevented from being performed when there is a high possibility to obstruct a course of the moving object approaching the self-vehicle from the rear side if the driver stops the self-vehicle going to turn to the left or right at an intersection as a result of performing the first warning. Namely, in accordance with first embodiment of the present invention, a warning as a driving assist for avoiding a contact of a self-vehicle going to turn to the left or right at an intersection and a moving object approaching the self-vehicle from a rear side of the self-vehicle can be appropriately performed without obstructing a course of the moving object.

Second Embodiment

Hereafter, a driving assist apparatus according to a second embodiment of the present invention (which may be referred to as a "second apparatus" hereafter) will be explained, referring to drawings.

As mentioned above, in the first apparatus, the moving object detecting part is configured so as to judge the necessity of the first warning based on the arrival time TA and the stoppage time TS and make the warning part 30 perform the first warning only when it is judged that the first warning is necessary. As a result, in accordance with the first apparatus, a warning as a driving assist for avoiding a contact of a self-vehicle going to turn to the left or right at an intersection and a moving object approaching the self-vehicle from a rear side of the self-vehicle can be appropriately performed without obstructing a course of the moving object.

However, when a possibility that the self-vehicle and the first object may contact is sufficiently low, it is thought that the necessity of performing the first warning is low. As specific examples of such a case, for example, a case where a distance between the first object that is a moving object approaching the self-vehicle from a rear side on a side to which the self-vehicle turns to the left or right at an intersection in front of the self-vehicle and the self-vehicle is sufficiently large, and/or a case where the speed of the self-vehicle is sufficiently high as compared with the speed of the first object, etc., can be mentioned.

Configuration

Therefore, the second apparatus is the above-mentioned first apparatus wherein the moving object detecting part is configured so as to judge the necessity of the first warning further based on a time-to-collision of the self-vehicle and the first object at the first time point. Specific usage forms of the time-to-collision (TTC) in the procedure for judging the necessity of the first warning are not limited as long as it is possible to judge appropriately whether the possibility that the self-vehicle SV and the first object MO may contact is sufficiently low or not.

For example, in the second apparatus, the moving object detecting part can be configured so as to judge that the first warning is unnecessary when the time-to-collision TTC is larger than a predetermined threshold value Th even in a case where the first warning is judged to be necessary based on the arrival time TA and the stoppage time TS.

Figure 4:
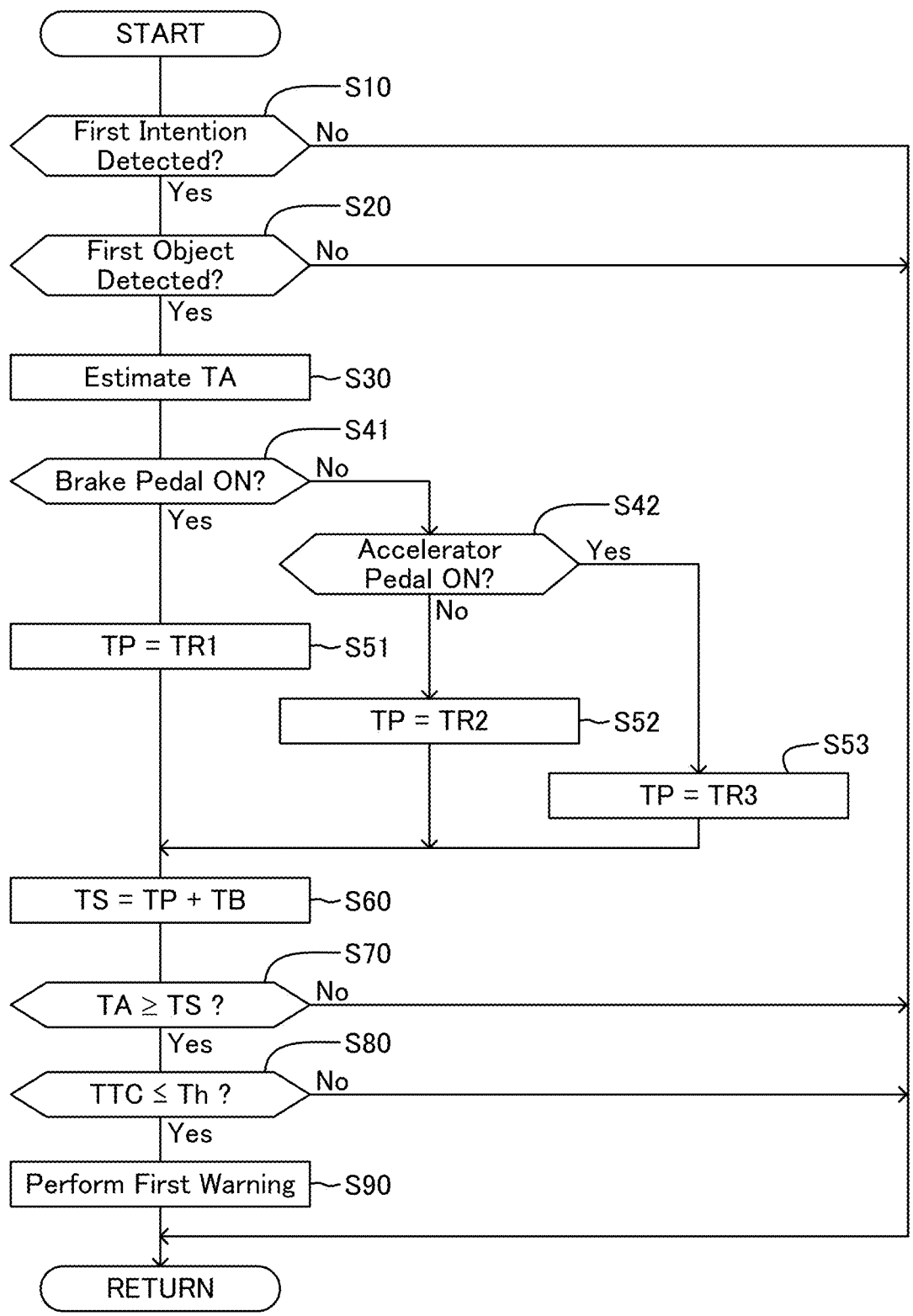
FIG. 4 is a flow chart for showing an example of a flow of various processing in a routine performed in a driving assist apparatus according to a second embodiment of the present invention (second apparatus).

FIG. 4 is a flow chart for showing an example of a flow of various processing in a routine for performing the above-mentioned functions in the second apparatus. The flow chart exemplified in FIG. 4 is the same as that of the flow chart exemplified in FIG. 3, except for a point that Step S80 in which the moving object detecting part 20 judges whether the time-to-collision TTC of the self-vehicle SV and the first object MO is equal to the predetermined threshold value Th or less is added between Step S70 in which the moving object detecting part 20 judges the necessity of the first warning based on the arrival time TA and the stoppage time TS and Step S90 in which the moving object detecting part 20 makes the warning part 30 perform the first warning.

In the example shown in FIG. 4, even in a case where the arrival time TA is not less than the stoppage time TS in Step S70 (Step S70: Yes) and it is judged that the first warning is necessary, it is judged whether the time-to-collision TTC is equal to the predetermined threshold value Th or not in the following step S80. When it is judged that the time-to-collision TTC is larger than the threshold value Th in Step S80 (Step S80: No), the routine is once ended, and the first warning is not performed. Namely, the first warning is not performed when a possibility that the self-vehicle SV and the first object MO may contact is sufficiently low.

On the other hand, when it is judged that the time-to-collision TTC is not more than the threshold value Th in Step S80 (Step S80: Yes), the moving object detecting part 20 makes the warning part 30 perform the first warning in the following step S90. Namely, when there is a possibility that the self-vehicle SV and the first object MO may contact, the first warning is performed based on the judgment result in Step S70.

Effects

As mentioned above, in the second apparatus, even in a case where it is judged that the first warning is necessary based on the arrival time and the stoppage time, the first warning is not performed when the possibility that the self-vehicle and the first object may contact is judged to be sufficiently low based on the time-to-collision. As a result, in accordance with the second apparatus, a warning as a driving assist for avoiding a contact of a self-vehicle going to turn to the left or right at an intersection and a moving object approaching the self-vehicle from a rear side of the self-vehicle can be more appropriately performed without obstructing a course of the moving object.

Working Example

Figure 5:
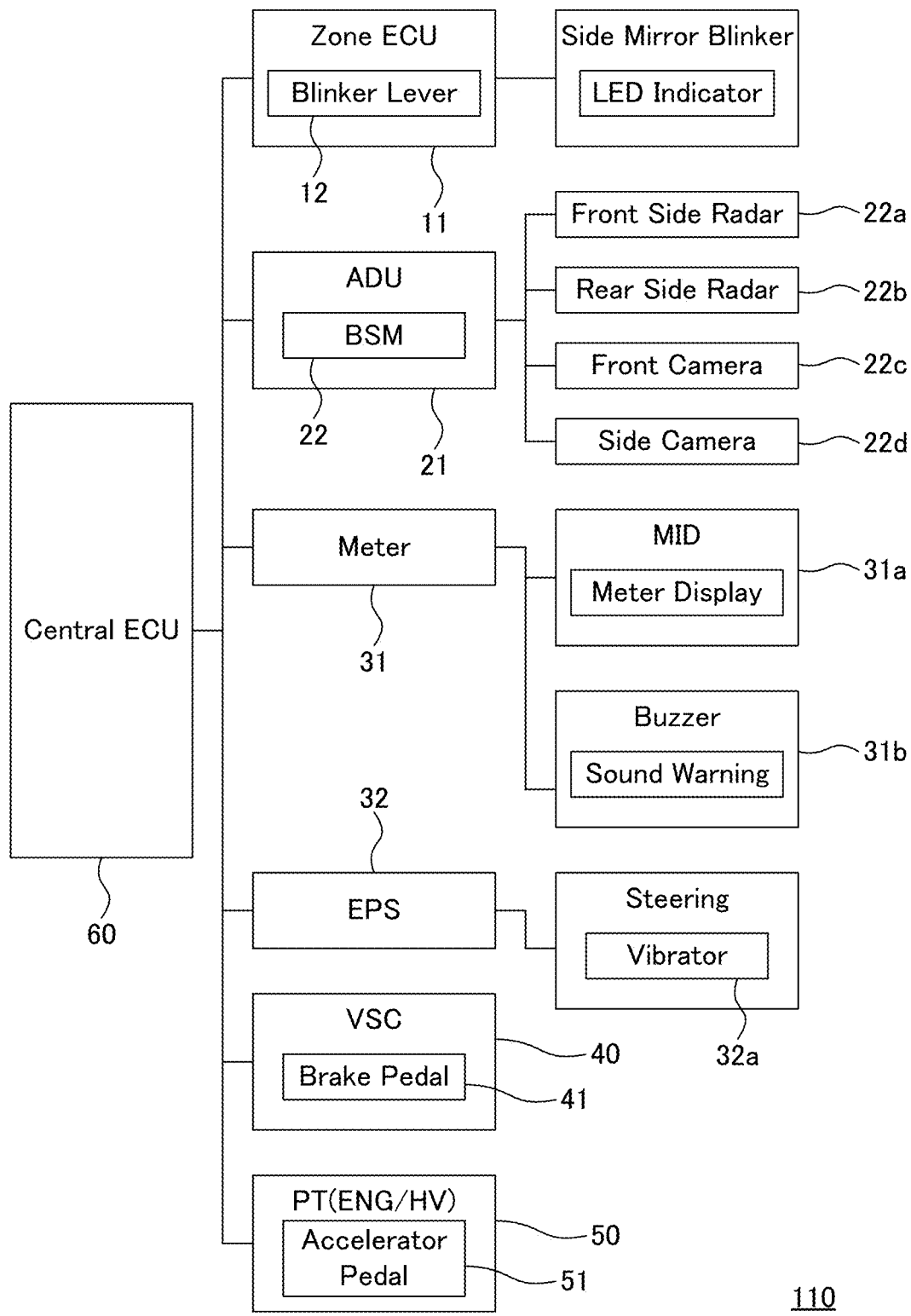
FIG. 5 is a schematic block diagram for showing an example of a configuration of a driving assist apparatus according to a working example of the present invention (working example apparatus).

Hereafter, a driving assist apparatus according to a working example of the present invention (which may be referred to as a "working example apparatus" hereafter) will be explained, referring to drawings. FIG. 5 is a schematic block diagram for showing an example of a configuration of the working example apparatus. The working example apparatus 110 exemplified in FIG. 5 comprises a power supply system managing part (Zone ECU) 11 having a blinker lever 12 as the intention detecting part 10, a driving assist part (ADU) 21 including a blind spot monitor (BSM) 22 having a front side radar 22a, a rear side radar 22b, a front camera 22c and a side camera 22d as the moving object detecting part 20, and a meter 31 having a multi-information display (MID) 31a and a buzzer 31b and an electric power steering (EPS) 32 having a vibrator 32a as the warning part 30, respectively. Furthermore, the working example apparatus 110 is configured so as to detect operation states of a brake and accelerator by a driver through a brake pedal 41 which a vehicle stability control part (VSC) 40 of the self-vehicle SV comprises and an accelerator pedal 51 which a power train (PT) 50 comprises. In addition, all of the above-mentioned respective components are controlled and managed by a central ECU (which may be referred to as a "gateway ECU") 60.

The working example apparatus 110 which has the configuration as mentioned above realizes the above-mentioned functions (a) to (d) according to the flow chart exemplified in FIG. 4. In the working example apparatus 110, the respective parameters for realizing the functions (a) to (d) were set as follows.

(1) The first section Z1 that is a "deceleration section"
Speed V1 of the self-vehicle SV at the first time point T1=Speed of the self-vehicle SV at the first time point T1
Decelerating D1=−0.2 G
Target speed V2=20 km/h
Turning radius R1 was fixed at the turning radius of the self-vehicle SV at the first time point T1.
(2) The second section Z2 that is a "clothoid section"
Decelerating D2=−0.1 G
Target speed V3=10 km/h
Target turning-radius R3=15 m
(3) The third section Z3 that was a "regular circle section"
Speed was fixed at V3.
Turning radius was fixed at R3.

As a result of setting the respective parameters as mentioned above, in a situation where the speed V1 of the self-vehicle SV at the first time point T1 is 35 km/h and the self-vehicle SV is going to turn to the left at the intersection in front of the self-vehicle SV as exemplified in FIG. 2, a warning as a driving assist for avoiding a contact of the self-vehicle SV and the first object MO that is a motorcycle approaching the self-vehicle from a rear left side of the self-vehicle could be appropriately performed without obstructing a course of the first object MO.

Although some embodiments and modifications which have specific configurations have been explained as the above, sometimes referring to accompanying drawings, for the purpose of explaining the present invention, it should not be interpreted that the scope of the present invention is limited to these exemplary embodiments and modifications, and it is needless to say that modifications can be properly added within the limits of the matter described in the claims and the specification. For example, the present invention can be applied to an autonomous vehicle.

REFERENCE SIGNS LIST 101, 110: Driving Assist Apparatus
10: Intention Detecting Part
   11: Power Supply System Managing Part (Zone ECU)
   12: Blinker Lever
20: Moving Object Detecting Part
   21: Driving Assist Part (ADU)
   22: Blind Spot Monitor (BSM)
      22a: Front Side Radar
      22b: Rear Side Radar
      22c: Front Camera
      22d: Side Camera
30: Warning Part
   31: Meter
      31a: Multi-Information Display (MD)
      31b: Buzzer
   32: Electric Power Steering (EPS)
      32a: Vibrator
40: Vehicle Stability Control Part (VSC)
   41: Brake Pedal
50: Power Train (PT)
   51: Accelerator Pedal
60: Central ECU

The invention claimed is:

1. A driving assist apparatus comprising an intention detecting part to detect a first intention that is an intention of a driver who is going to make a self-vehicle turn to the left or right at an intersection in front of said self-vehicle, a moving object detecting part to detect a first object that is a moving object approaching said self-vehicle from a rear side on a side to which said self-vehicle turns to the left or right when said first intention is detected, and a warning part to perform a first warning that is a warning about said first object when said first object is detected, wherein:
  said moving object detecting part is configured to,
    estimate an arrival time that is a period from a first time point that is a time point when said first intention is detected to a second time point that is a time point when said self-vehicle reaches a first intersection point that is an intersection point of a first locus that is a running path estimated for said first object and a second locus that is a running path estimated for said self-vehicle,
    estimate a stoppage time that is a period from said first time point to a third time point that is a time point when stoppage of said self-vehicle is completed under a predetermined condition according to operation states of an accelerator pedal and/or a brake pedal by said driver at said first time point,
    judge necessity of said first warning based on said arrival time and said stoppage time, and
    make said warning part perform said first warning only when said first warning is judged to be necessary.

2. The driving assist apparatus according to claim 1, wherein:
  said moving object detecting part is configured to,
    judge that said first warning is necessary when said arrival time is equal to or longer than said stoppage time, and
    judge that said first warning is unnecessary when said arrival time is shorter than said stoppage time.

3. The driving assist apparatus according to claim 1, wherein:
  said moving object detecting part is configured to,
    judge the necessity of said first warning further based on a time-to-collision of said self-vehicle and said first object at said first time point.

4. The driving assist apparatus according to claim 3, wherein:
  said moving object detecting part is configured to,
    judge that said first warning is unnecessary when said time-to-collision is longer than a predetermined threshold value even in a case where said first warning is judged to be necessary based on said arrival time and said stoppage time.

* * * * *